United States Patent [19]

Stroomer et al.

[11] Patent Number: 4,567,522
[45] Date of Patent: Jan. 28, 1986

[54] LINE SYNCHRONIZING CIRCUIT FOR A PICTURE DISPLAY DEVICE

[75] Inventors: Martinus V. C. Stroomer; Frederick M. Boekhorst, both of Eindhoven, Netherlands

[73] Assignee: U.S. Philips Corporation, New York, N.Y.

[21] Appl. No.: 691,780

[22] Filed: Jan. 16, 1985

Related U.S. Application Data

[63] Continuation of Ser. No. 405,125, Aug. 4, 1982, abandoned.

[30] Foreign Application Priority Data

Aug. 6, 1981 [NL] Netherlands ............... 8103705

[51] Int. Cl.[4] .......................................... H04N 7/00
[52] U.S. Cl. ................................ 358/158; 358/174; 331/20
[58] Field of Search ............ 358/158, 174, 178, 148; 331/20, 25, 167

[56] References Cited

U.S. PATENT DOCUMENTS

| | | | |
|---|---|---|---|
| 3,906,155 | 9/1975 | van Straaten | 358/158 |
| 4,203,076 | 5/1980 | Yamashita | 358/158 |
| 4,231,064 | 10/1980 | Uchida | 358/158 |
| 4,389,676 | 6/1983 | Balaban et al. | 331/167 |
| 4,393,405 | 7/1983 | Ikeda | 358/158 |
| 4,396,948 | 8/1983 | Fernsler et al. | 358/158 |

OTHER PUBLICATIONS

"Versatile LSI Frequency Synthesizer System" by T. G. Giles; Electronic Components and Applications, vol. 2, No. 2, Feb. 1980, pp. 91-105.
Electronics Dictionary, Fourth Edition, McGraw-Hill Book Company, p. 10.

*Primary Examiner*—John C. Martin
*Assistant Examiner*—Michael D. Parker
*Attorney, Agent, or Firm*—Thomas A. Briody; William J. Streeter; Marianne Rich

[57] ABSTRACT

A line synchronizing circuit for a picture display device comprising a voltage-controlled oscillator for generating a signal whose frequency is higher than the line frequency, a frequency dividing circuit for dividing the frequency of the oscillator signals and a phase comparison stage for generating a control voltage in dependence on the phase deviation between the signals applied thereto, more specifically a received line synchronizing signal and a locally generated reference signal. The elements of the line phase control loop, are part of an integrated circuit which functions as a frequency synthesizing circuit. The reference-frequency dividing circuit incorporated in the integrated circuit is programmed to operate with a constant divisor.

7 Claims, 1 Drawing Figure

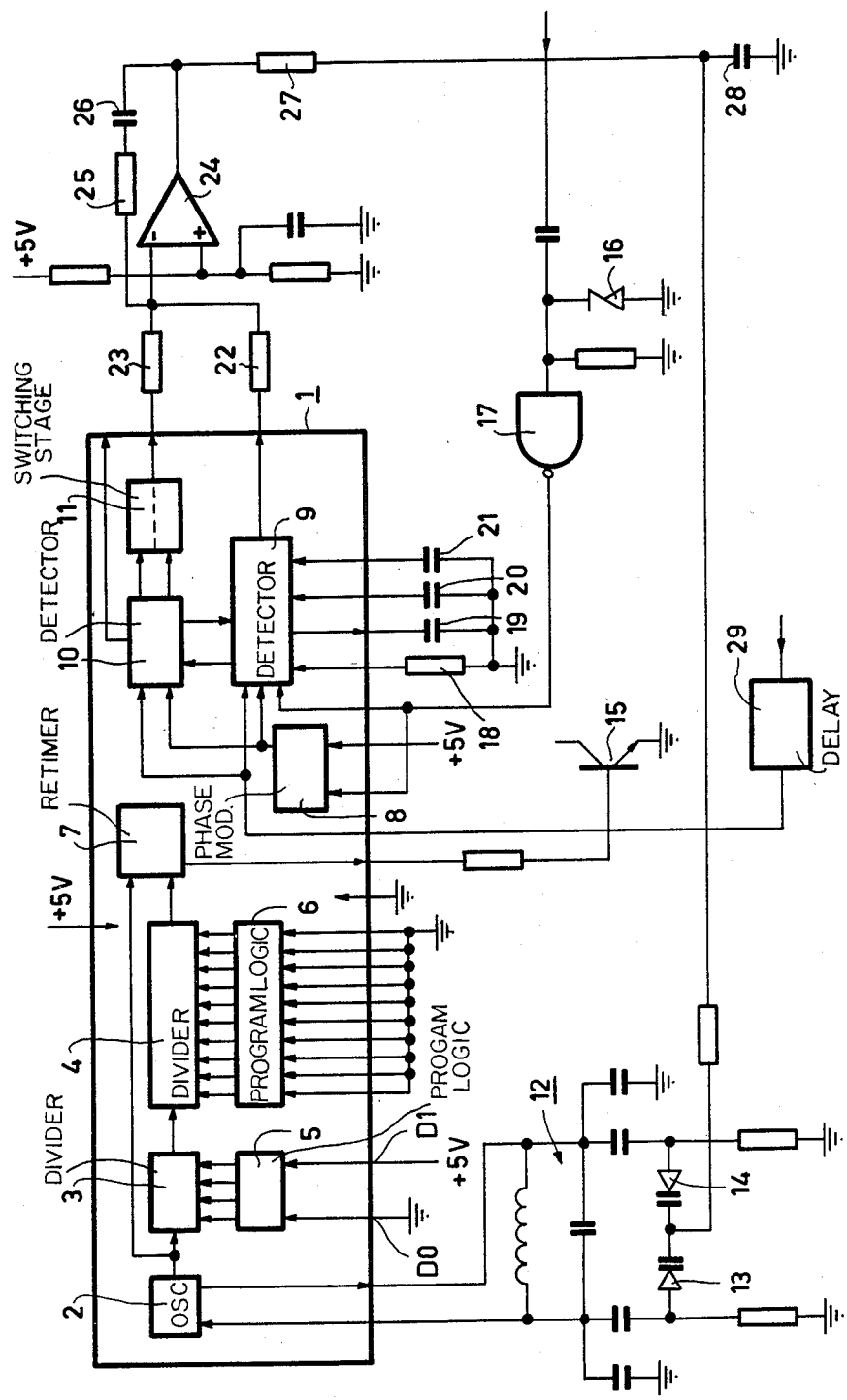

LINE SYNCHRONIZING CIRCUIT FOR A PICTURE DISPLAY DEVICE

This is a continuation, of application Ser. No. 405,125, filed Aug. 4, 1982, now abandoned.

The invention relates to a line synchronizing circuit for a picture display device, comprising a voltage-controlled oscillator for generating a signal whose frequency is higher than the line frequency, a frequency dividing circuit connected to the oscillator for deriving a signal of the line frequency, a phase comparison stage for generating a control voltage in dependence on the phase deviation between received line synchronizing pulses and a locally generated reference signal of the line frequency and a loop filter for smoothing the control voltage and for applying the smoothed control voltage to the oscillator for controlling the frequency and/or phase thereof.

Such a phase control loop is frequently used in television technique. There the oscillator is continuously readjusted by the output voltage of the comparison stage which determines the phase deviation between the received line synchronizing pulses and the reference pulses. The frequency of the oscillator may be the line frequency, i.e. approximately 15 kHz in accordance with the majority of television broadcast standards. Synchronizing circuits in which the frequency of the oscillator is higher than the line frequency and the frequency of the drive signal for the (horizontal) line deflection is derived by division, are known. The publication "IEEE Transactions on Consumer Electronics", Vol. CE-24, No. 3, pages 284 to 290, published in August 1978, for example, discloses a circuit in which the frequency of the oscillator is 32 times higher than the line frequency.

For picture display devices for which a higher quality is desired than for the now customary television receivers, a value may be chosen for the line frequency which is higher than the value laid down in a television broadcast standard. This is particularly the case for picture display tubes having a high resolution which are, for example, used to display digitally generated pictures. It is obvious that when designing a line synchronizing signal suitable for such a high line frequency it will first be tried to adapt an existing circuit designed for a line frequency of approximately 15 kHz, as usually existing circuits are available in integrated form and are therefore as a rule reliable and comparatively inexpensive.

It has, however, been found that existing control circuits are not always suitable. Indeed the locally generated reference signal has in the locked state the same average frequency as the incoming line synchronizing signal but phase jitter occurs in the form of quick phase shifts. This results in positional errors on the picture display screen, which phenomenon is highly annoying.

A rule of thumb is that the maximum phase shift still acceptable corresponds to approximately one tenth of a picture element. For the European broadcast standard for which the video band width is in the order of 5 MHz, so that a picture element corresponds to a duration of approximately 100 ns, this implies that the maximum phase error, expressed in units of time, is 10 ns. It will be seen that an existing line phase control loop results in an impermissible error if a standard for fascimile of the C.C.I.T.T. (Comité Consultatif International Télégraphique et Téléphonique) is considered, wherein 1728 picture elements per active line and 7.7 lines per mm height is recommended, which for the European A4-format of 210×297 mm results in 2287 active lines. If now a high field frequency, for example 92 Hz, with a 2:1 interlace is opted for, then it appears that in such a system the line frequency is approximately 130 kHz, which corresponds to a line period of approximately 7.5 μs. If 1.8 μs is subtracted therefrom for the flyback period then an active line has a duration of approximately 5.7 μs, that is to say 3.3 ns per picture element, so that the maximum error may have a duration of approximately 0.3 ns. It will be obvious that an existing line phase control loop is not sufficiently accurate and that phase shifts will be visible. Consequently, the picture will be distorted on display.

SUMMARY OF INVENTION

It is an object of the invention to provide a line synchronizing circuit of the above-mentioned type, use being made of an existing integrated circuit while the above-mentioned phase jitter does not substantially occur, and to that end the line synchronizing circuit according to the invention is characterized in that the oscillator, the frequency dividing circuit and the phase comparison stage are part of an integrated circuit in the form of a frequency synthesizing circuit, the reference-frequency dividing circuit incorporated in the integrated circuit being programmed to operate with a constant divisor.

The invention is based on the recognition of the fact that such an integrated circuit comprises elements which are suitable for use in a line phase control loop, the properties of these elements and particularly the high accuracy of the phase comparison stage being of such a nature that unwanted frequency modulation, and consequently phase modulation, of the oscillator will not occur, not even at high line frequencies. It is consequently no longer necessary to design a completely novel integrated circuit, which would be very costly.

The invention will now be further described by way of example with reference to the accompanying FIGURE which shows a circuit diagram of a line synchronizing circuit in accordance with the invention.

The FIGURE shows the internal circuit diagram of a frequency synthesizing circuit 1 of a known type, namely the integrated circuit HEF 4750 (Philips) which is extensively described in the publication "Electronic components and applications", Vol. 2, No. 2, pages 91 to 105, inclusive, published in February 1980, and which, normally in combination with a dividing circuit, for example of the type HEF 4751, and some further elements forms part of a frequency synthesizing system which is also described in the said publication. Circuit 1 comprises a reference oscillator with a buffer stage 2, two reference frequency dividing circuits 3 and 4, each having a programming logic 5 and 6, respectively, a retiming circuit 7, a phase modulator 8, two phase detectors 9 and 10 and a switching stage 11.

For the frequency synthesizing system, oscillator 2 is a stabilized reference oscillator which is stabilized by means of an externally connected crystal. In the circuit of the FIGURE oscillator 2 is in the form of a voltage-controlled oscillator. To that end, the crystal is preferably replaced by a LC-circuit 12 with which two capacitance diodes 13 and 14 are arranged in parallel. A control voltage may be applied to the junction of diodes 13 and 14. Nominally, that is to say without control voltage, the tuning frequency of oscillator 2 is approximately 1.3 MHz.

The frequency of oscillator 2 can be divided by 1, 2, 10 or 100 by means of reference dividing circuit 3, while reference dividing circuit 4 may divide the frequency obtained by a divisor which is programmable from 1 to 1024. For the measure in accordance with the invention the programming input, denoted D0 in the said publication, of logic circuit 5, is connected to ground, while the programming input D1 of logic circuit 5 is connected to the positive terminal of a 5 V supply source which applies supply energy to the entire circuit and whose negative terminal is connected to ground. In this manner the divisor of circuit 3 is adjusted to 10. As all the programming inputs of logic circuit 6 are connected to ground, the divisor of circuit 4 is adjusted to 1. In these circumstances circuit 7 produces a pulse-shaped signal having a repetition frequency of 130 KHz, which is the line frequency chosen for the picture display system of which the present line synchronizing circuit forms part. This signal which is internally synchronized with the signal of oscillator 2, is applied to a driver transistor 15, which forms part of a line deflection circuit. Both the driver stage and the output stage of the deflection circuit are of a prior art construction and are therefore not further described here.

During the very brief retrace period, i.e. approximately 1.8 μs, a retrace pulse of a high amplitude is present in the deflection circuit. This pulse is given the suitable shape and polarity by means of a limiter circuit, comprising a zener diode 16, and of an inverter stage 17. The reference pulse obtained is applied to an input of phase detector 9, more specifically to the strobe input thereof. The input of phase modulator 8 which is normally connected to the divider circuit of the frequency synthesizing system is connected to the input of the phase detector, while the modulation input of this modulator is connected to the positive supply voltage. As a result thereof phase modulator 8 is not operative. The other input of phase detector 9 receives the line synchronizing signal.

Detector 9 is the main phase detector; it operates in accordance with a sample- and hold principle. A resistor 18 and three capacitors 19, 20 and 21 are connected to this phase detector in the prescribed manner. Phase detector 10 whose inputs are connected to the inputs of detector 9 provides for rapid pull-in of the phase control loop, whereafter detector 10 is switched-off by means of switching stage 11, while detector 9 locks the loop in the synchronized state with high gain and low-noise level. By means of a resistor 22 detector 9, and by means of a resistor 23 detector 10 are connected to the inverting input of a differential amplifier 24, whose non-inverting input is connected to a positive direct voltage. A RC-series network 25, 26 is included between the inverting input and the output of amplifier 24. Elements 22 to 26, inclusive form an active loop filter for smoothing the control voltage generated by the two phase detectors, this control voltage being a measure of the phase deviation between the signals applied thereto, namely the line synchronizing signal and the locally generated reference signal. If during pull-in the frequencies are not equal then the voltage applied to the filter is an a.c. voltage. If because of the action of the loop, the frequencies have become equal, this voltage becomes a direct voltage. An RC-network 27, 28 which has for its function to block high-frequency noise signals which might produce phase modulation supplies the control voltage smoothed by the filter to capacitance diodes 13 and 14 for readjusting the frequency and/or the phase of oscillator 2. The cut-off frequency of network 27, 28 must be sufficiently high to prevent instability of the loop. A value of approximately 50 kHz has been chosen as this cut-off frequency.

As circuit 1 introduces some internal delays, there remains a slight phase difference between the signals compared by phase detectors 9 and 10. There is namely an interval of approximately 300 ns between corresponding pulse edges of these signals. This can be compensated for by applying the line synchronizing signal originating from a synchronizing-separating stage through a delay element 29. In practice, element 29 is in the form of a plurality of inverter stages. Finally, the out-of-phase-indication output of the integrated circuit is not connected.

In one embodiment of the circuit shown in the FIGURE the prevailing phase shift could hardly be measured, that is to say it was definitely shorter, in units of time, than 1 ns. It will be clear that the circuit is also suitable for use for frequencies other than 130 kHz where circuit 12 is tuned to a different frequency or to programm dividing circuits 3 and/or 4 to a different divisor. It will also be obvious that oscillator 2 may be in the form of a crystal oscillator.

What is claimed is:

1. In a video system having a picture display device and a horizontal deflection circuit, apparatus for creating a circuit synchronizing a locally generated line frequency signal to a received line synchronizing signal by modification of a high frequency synthesizing circuit constituted by an integrated circuit having stabilized reference oscillator means for generating a signal having a frequency higher than line frequency, controllable divider means connected to said stabilized reference oscillator means, a retiming circuit connected to said divider means, said frequency synthesizing circuit further having phase detector means, said apparatus comprising means connected to said divider means for maintaining said divider means at a predetermined constant divider ratio;

means connecting said retiming means to said horizontal deflection circuit of said picture display device, whereby said horizontal deflection circuit generates said locally generated line frequency signal;

means for applying said locally generated line frequency signal and said received line synchronizing signal to said phase detector means;

filter means connected to said phase detector means for furnishing a filtered control signal indicative of the phase difference between said received line synchronizing signal and said locally generated line frequency signal;

and means for applying said filtered control signal to said oscillator means, whereby said locally generated line frequency signal is synchronized to said received line synchronization signal.

2. Apparatus as set forth in claim 1, wherein said divider means has a plurality of divider input terminals; and wherein said means for maintaining said predetermined constant divider ratio comprises means connecting selected ones of said plurality of divider input terminals to ground potential.

3. Apparatus as set forth in claim 2, wherein said filter circuit means comprises a difference amplifier having RC feedback.

4. Apparatus as set forth in claim 3, further comprising a delay element for delaying said received line synchronizing signal before application to said phase detector means.

5. In a video system having a picture display device and a horizontal deflection circuit, apparatus for creating a circuit synchronizing a locally generated line frequency signal to a received line synchronizing signal by modification of a high frequency synthesizing circuit constituted by an integrated circuit having a stabilized reference oscillator having first and second externally available oscillator terminals, controllable divider means connected to said stabilized reference oscillator, said controllable divider means having externally available divider terminals, a retiming circuit connected to said divider means and having an externally available retiming terminal, said frequency synthesizing circuit further having a phase modulator circuit, phase detector means connected to said phase modulator circuit, said phase detector means having externally available input terminals and a detector output terminal, and a switching stage connected to said phase detector means, said apparatus comprising a voltage controlled frequency changing circuit connected to said first and second oscillator terminals;

means connected to said externally available divider terminals for maintaining said divider means at a predetermined constant divider ratio;

means connecting said externally available retiming terminal to said horizontal deflection circuit of said picture display device, whereby said horizontal deflection circuit generates said locally generated line frequency signal;

means for applying said locally generated line frequency signal and said received line synchronizing signal to respective ones of said externally available input terminals of said phase detector means;

filter means connected to said phase detector output terminal for furnishing a filtered control signal indicative of the phase difference between said received line synchronizing signal and said locally generated line frequency signal;

and means for applying said filtered control signal to said voltage controlled frequency changing circuit, whereby said locally generated line frequency signal is synchronized to said received line synchronization signal.

6. Apparatus as set forth in claim 5, wherein said divider means comprises a first and second divider circuit having, respectively, first and second divider output terminals;

and wherein said means for maintaining said predetermined constant divider ratio comprises programmable logic means connected to said divider means and having logic input terminals, and means for connecting said logic input terminals to a reference potential.

7. Apparatus as set forth in claim 6, wherein said filter circuit means comprises a difference amplifier having RC feedback.

* * * * *